(12) United States Patent
Klingler et al.

(10) Patent No.: US 6,189,801 B1
(45) Date of Patent: Feb. 20, 2001

(54) DEVICE FOR HEATING AND/OR AIR CONDITIONING A VEHICLE INTERIOR

(75) Inventors: Dietrich Klingler, Heubach; Klaus Voigt, Bietigheim-Bissingen, both of (DE)

(73) Assignee: Behr GmbH & Co., Stuttgart (DE)

(*) Notice: Under 35 U.S.C. 154(b), the term of this patent shall be extended for 0 days.

(21) Appl. No.: 09/311,590

(22) Filed: May 14, 1999

(30) Foreign Application Priority Data

May 16, 1998 (DE) .............................................. 198 22 173

(51) Int. Cl.⁷ .................................................... B60H 1/02
(52) U.S. Cl. .......................................... 237/12.3 B; 165/78
(58) Field of Search ................. 165/78, 42, 43; 237/12.3 B

(56) References Cited

U.S. PATENT DOCUMENTS

| | | | |
|---|---|---|---|
| 4,482,011 | * 11/1984 | Jacquet | 165/67 |
| 4,533,081 | * 8/1985 | forsting et al. | 237/12.3 B |
| 4,681,153 | * 7/1987 | Uchida | 165/31 |
| 4,829,884 | * 5/1989 | kagohata | 165/16 |
| 4,899,809 | * 2/1990 | Takenaka et al. | 165/12 |
| 5,752,655 | * 5/1998 | kodama et al. | 237/12.3 B |
| 5,878,806 | * 3/1999 | Denk et al. | 165/42 |

FOREIGN PATENT DOCUMENTS

| | | |
|---|---|---|
| 4119474 | 12/1992 | (DE) . |
| 196 39 321 | 4/1997 | (DE) . |
| 0536498 | 4/1993 | (EP) . |

* cited by examiner

*Primary Examiner*—Harold Joyce
*Assistant Examiner*—Derek S. Boles
(74) *Attorney, Agent, or Firm*—Evenson, McKeown, Edwards & Lenahan, P.L.L.C.

(57) ABSTRACT

A particular device is provided for heating and/or air conditioning a vehicle interior. Housings for air conditioners of motor vehicles, typically, are relatively cumbersome to manufacture because of the need to install control flaps in front of and behind the heater. Sealing of the heater in its installation housing is also difficult. It is proposed, therefore, to make the housing for receiving the heater in two parts and to provide a plug-in part for the heater as well as a frame that can be snapped onto the plug-in part as a closure. Both the plug-in part and the frame are provided with an integral control flap arrangement.

20 Claims, 6 Drawing Sheets

DEVICE FOR HEATING AND/OR AIR CONDITIONING A VEHICLE INTERIOR

This application claims the priority of German patent application No. 198 22 173.8, filed May 16, 1998, the disclosure of which is expressly incorporated by reference herein.

BACKGROUND AND SUMMARY OF THE INVENTION

This invention relates to a device for heating and/or air conditioning a vehicle interior. The device is provided with a heater located in an air guide channel and a housing in the shape of a frame aligned transversely to the air flow, and has control flaps to regulate the air volume flowing through.

Devices of this kind are known from DE 41 19 474 A1. In the devices described by that document, an evaporator is located in a housing of an air conditioner and a heater is located behind the evaporator in a bent air guide channel. The heater is aligned in a frame-like housing transversely to an air flow guided through the air guide channel. The air guide channel for the heater, in this case, is provided behind the heater with pivotable control flaps to open or close the air guide channel, which then terminates in a mixing chamber in which an air stream from the evaporator can also enter when corresponding control flaps for this air guide branch are open. Heating or air conditioning devices of this kind are relatively cumbersome because of the need to install control flaps behind the heater and behind the evaporator. In addition, the possibility cannot always be ruled out that when only cooling is required and the heater must therefore be shut off, a certain amount of air will still be heated by the heater, which initially is still warm, and mixed with the cooling air. As a result, immediately desired cooling cannot always be achieved.

In known heating and air conditioning devices of the type mentioned at the outset, the sealing of the heater in its housing is also relatively cumbersome and, as a rule, is achieved by manually applied adhesive seals in order to compensate for manufacturing tolerances.

It is intended to provide, by the present invention, a design for a heating and air conditioning device of the type mentioned above so that manufacture and assembly are simplified and so that undesired residual heating following the shutoff of the heater is prevented as completely as possible.

To achieve this goal, in a device such as that mentioned at the outset, it is proposed to make the housing in two parts and have it consist of a plug-in part for the heater and a housing part mounted on the plug-in side, and to provide the plug-in part and the housing part with elements for opening and closing at least a portion of the free through flow cross section.

As a result of this design, the heater can be inserted in a relatively simple fashion from one side into the plug-in part of the housing and then secured by mounting the second housing part. Since the throughput cross section can now be open or closed on both the air inlet side and the air outlet side of the heater, it becomes relatively simple to prevent the air delivered to the vehicle interior from being subjected to residual heating in the vicinity of the heater, since the heater can be closed off on both sides.

Although it is known from Japanese disclosure document 61-1527 A to provide a box-like housing for a heater with air control flaps on its inlet and outlet sides, that document discloses the heater as aligned with both its inlet and outlet surfaces parallel to the walls of an air guide channel and hence parallel to the airflow. Therefore, the pivotable flaps serve to deflect the flowing air into the inlet cross section of the heater. They are, therefore, made with different widths. Only one deflecting flap is provided on the outlet side. This deflecting flap is in an operating connection with the flaps located on the inlet side and likewise serves to deflect the escaping air.

According to one feature of the invention, the mounted housing part can be a frame that can be snapped elastically onto the plug-in part, and controllable shutter arrangements, controllable at least on the plug-in part, can be provided as opening and closing elements. The shutter arrangements make it possible to close either the entire cross section or only a part thereof. This design also makes it possible to meter precisely the volume of air guided through the heating body, and hence made available, without providing additional air flaps.

According to another feature of the invention, a check valve arrangement can be provided as opening and closing elements on the mounted frame, with the check valves being mounted movably, in an especially simple fashion, in front of the output slots and with the frame of the outlet slots having a supporting surface for the check valves that is aligned diagonally to the horizontal. When the shutter arrangement on the inlet side of the heater in the housing is closed and through flow is prevented, the check valves can pivot downward onto the associated supporting surfaces under their own weight and, in this way, close off the heater on the outlet side, so that residual heating is prevented. No expense is required for controlling such a check valve arrangement.

In order to facilitate insertion of the heater into a housing, or in other words into its plug-in part, the plug-in part can be provided with a circumferential seal against the heater. This seal consists of at least two opposite sides of a sealing strip made of a relatively hard material, especially plastic material, that can be pressed elastically against the heater. This design makes it possible, because of the low frictional forces, simply to push the heater into the plug-in part by applying it against its sealing strips and thus to produce a seal. According to a further feature of the invention, the sealing strip can be supported by a plurality of ribs on the plug-in part, with the ribs consisting of plastic material and being aligned parallel to one another in the flow direction. A design of this kind permits a close fit between the sealing strip and the heater without any problems during installation.

According to yet another feature of the invention, in the area located laterally with respect to the two sealing strips, a seal can be provided on the plug-in part which abuts the heater when the heater is in the installed position. Of course, it is also possible to locate the plug-in housing itself on a mount in the air guide channel and to provide a seal between the mount and the plug-in part so that there is no way for the flowing air to enter the area behind the heater other than through the heater itself in the desired quantity.

BRIEF DESCRIPTION OF THE DRAWINGS

The invention is shown in the drawing figures, which illustrate several embodiments, and will be described below.

DESCRIPTION OF THE PREFERRED EMBODIMENTS

Figure 1:
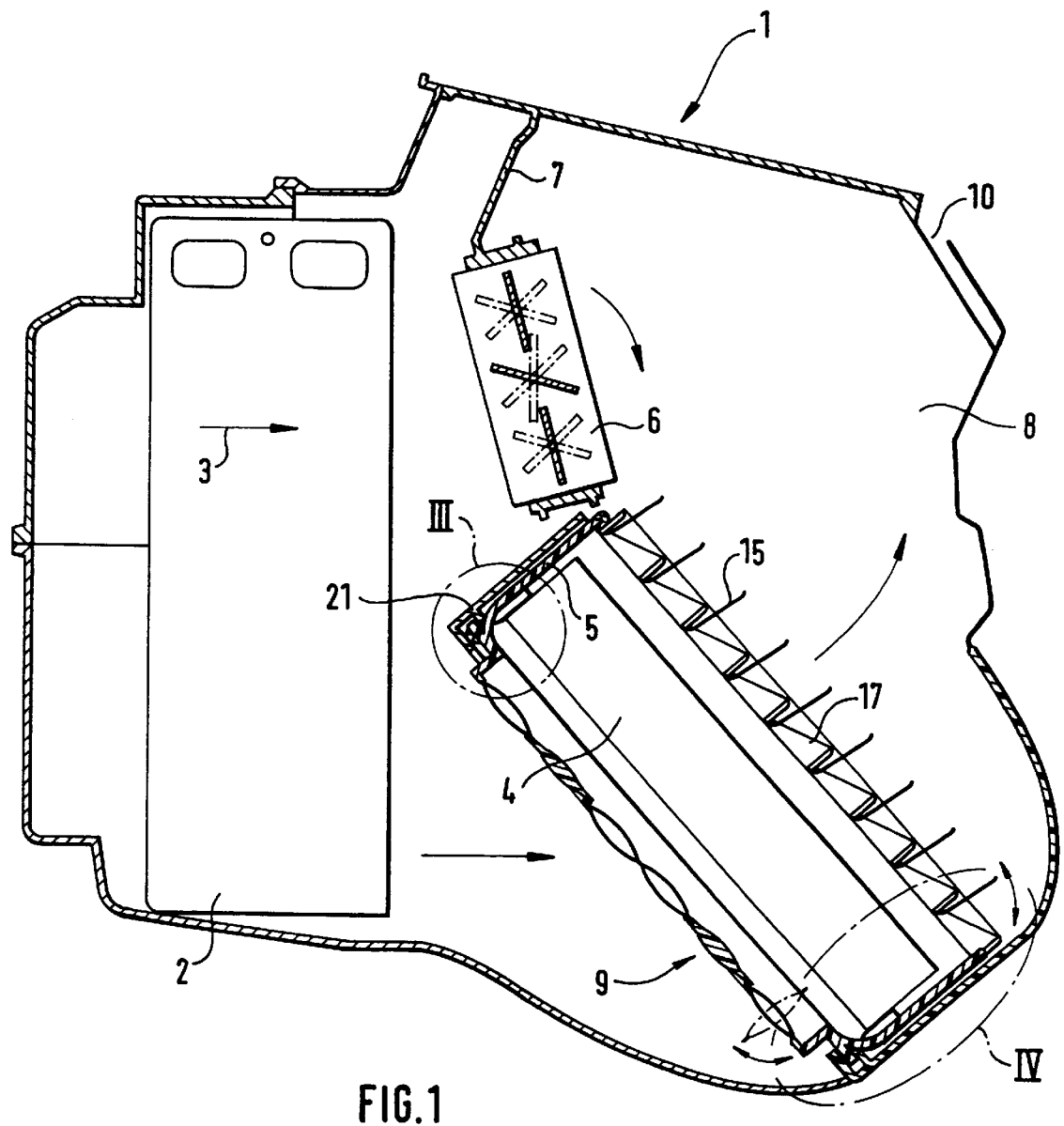
FIG. 1 is a schematic lengthwise section through the housing of an air conditioner for an automobile.

FIG. 1 shows an air conditioner designed according to the invention for an automobile. The air conditioner is accommodated in a housing 1 and essentially consists of an evaporator 2 through which fresh air that has been drawn in laterally, for example in the direction of arrow 3, can flow. A heater 4 is connected downstream from evaporator 2. This heater, in turn, is inserted into housing 5 in the housing of the air conditioner. The housing 5 is firmly anchored to a mount inside main housing 1. Housing 5, together with a fan flap arrangement 6 and the wall part 7, forms a partition in the main housing 1 that delimits a mixing chamber 8 from a space located behind the evaporator 2. Depending on the opening of the flaps in the arrangement 6 and a shutter arrangement 9, to be described in detail below, upstream of heater 4, cooled and/or heated air will be present in mixing chamber 8 which then can flow through output openings 10, not shown in greater detail, into the vehicle interior.

Figure 2:
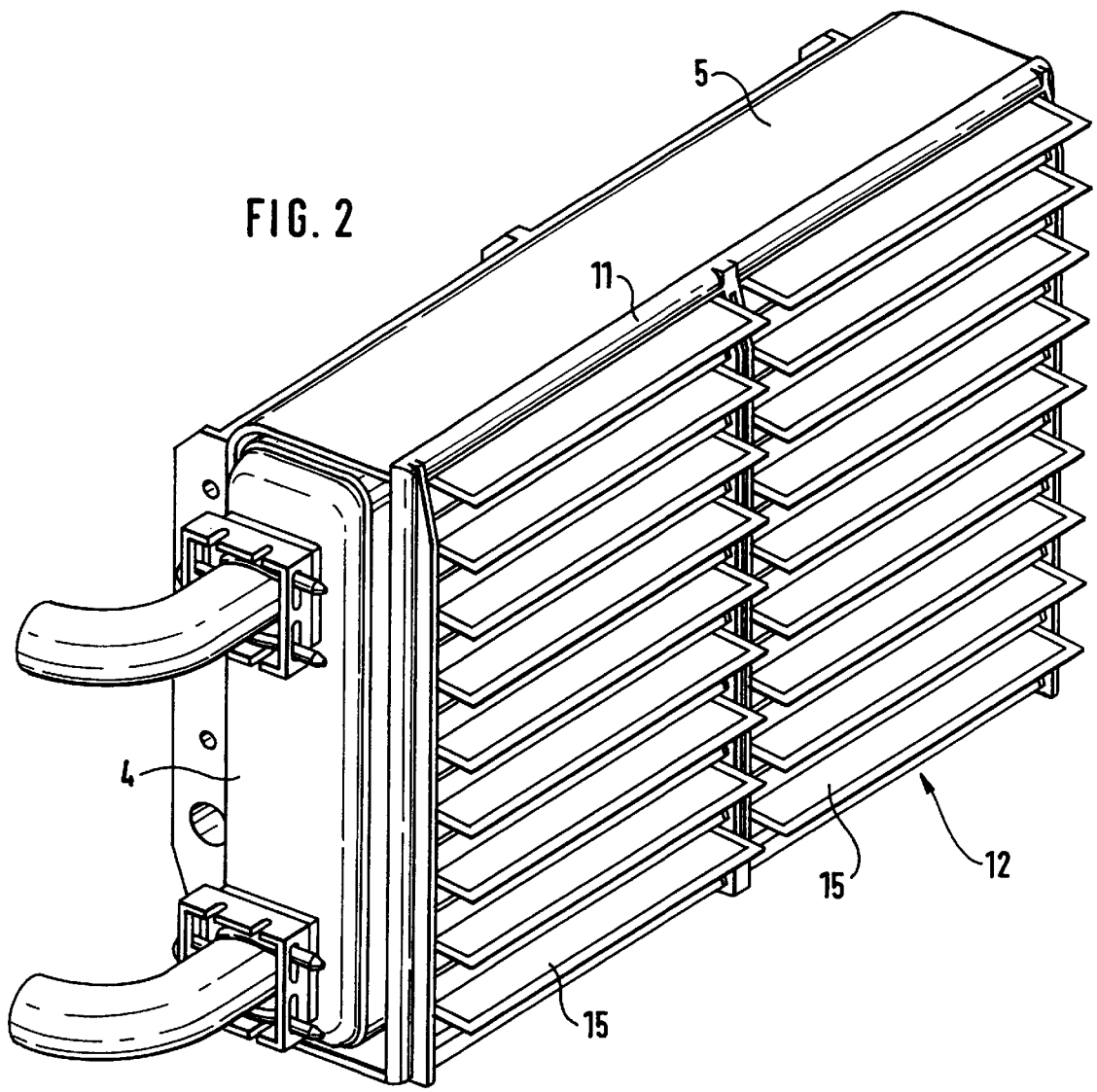
FIG. 2 is an enlarged perspective view of the heater provided in the air conditioner in FIG. 1.
Figure 7:
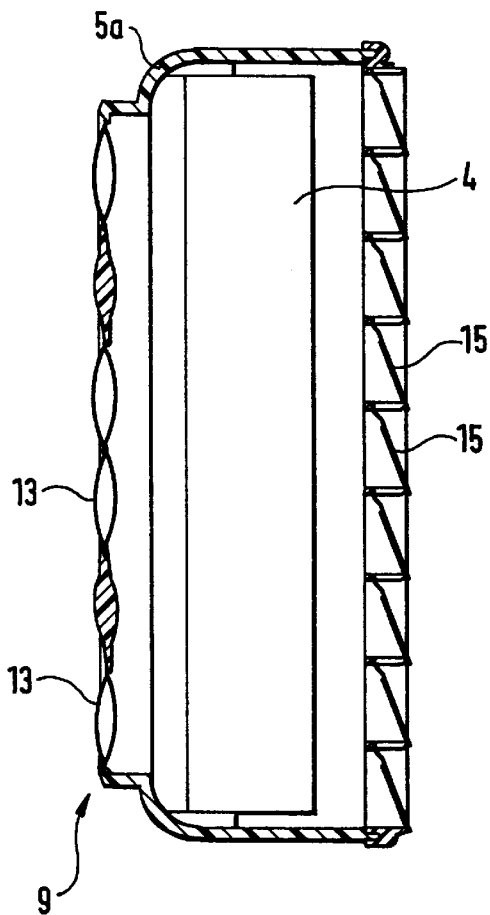
FIG. 7 is a schematic view of a lengthwise section through the housing and the heater in FIGS. 1 and 2.
Figure 8:
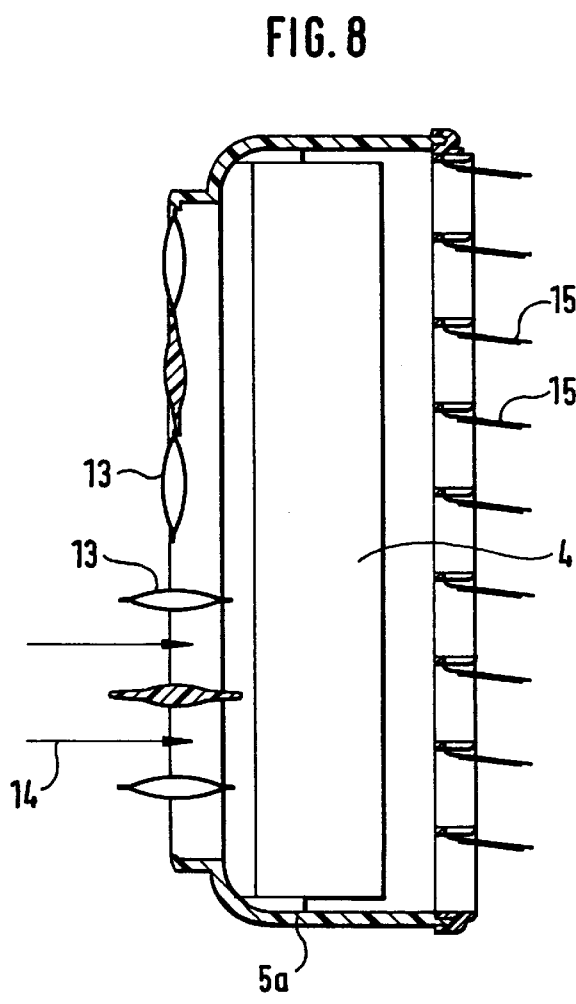
FIG. 8 is a view similar to FIG. 7 but with another setting of the shutter blades for controlling the inward flow.

FIG. 2 shows clearly, in conjunction with FIGS. 7 and 8, that the housing 5 is made in two parts, namely a plug-in part 5a for the heater 4 and a frame 11 that is placed in plug-in part 5a after the heater 4 has been pushed in. The frame is provided, in the embodiment shown, with a check valve arrangement 12. Plug-in part 5a in turn is equipped on its air inlet side with the shutter arrangement 9 mentioned above. As FIG. 8 illustrates, this makes it possible, depending on the heat requirement called for, to pivot either all the flaps 13 of the shutter arrangement or only a portion thereof so that the air, which was previously prevented by the closed arrangement according to FIG. 7 from entering the heater 4, can now pass in the direction of arrows 14 through the heater 4. As a result of the flow forces thus produced, flaps 15 of check valve arrangement 12 automatically assume their open position as shown in FIG. 8, while they were previously closed as shown in FIG. 7.

Figure 6:
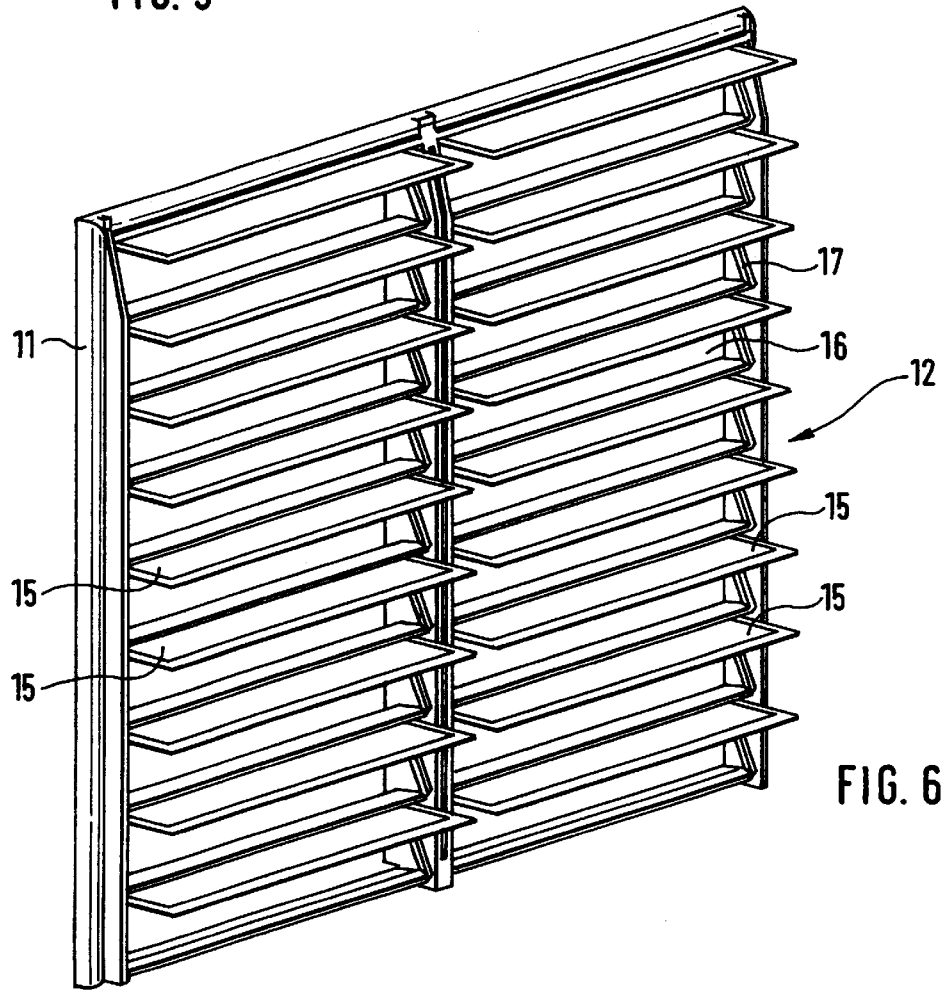
FIG. 6 is a perspective view of a part of the receiving housing for the heater according to FIG. 2.

FIG. 6 shows that the frame 11 is provided with a row of outlet slots 16, each of which is surrounded by a frame 17 which, in turn, extends diagonally to the sides of the frame 11, so that these frames 17, as can be seen from FIG. 1, lie in a horizontal plane even if the housing 5 assumes a sloping position with respect to heater 4. The check valves 15, mounted, for example, by film hinges to the frame 11, which is made of plastic, therefore fall back under their own weight into the closed position shown in FIG. 7 when they are not subjected to a flow from the side of the heater 4. This design prevents air in the mixing chamber 8 from coming in contact with the heater 4 when cooling is exclusively desired. In this situation, the heater 4 is blocked by the closed shutter arrangement 9 from a through flow and is no longer traversed by a heating means such as, for example, the engine coolant. Nevertheless, the heater itself remains warm for a period of time even when it is in the shut-off state. In order to prevent undesired heating of the air in the mixing chamber 8, the check valve arrangement 12 is closed.

Figure 3:
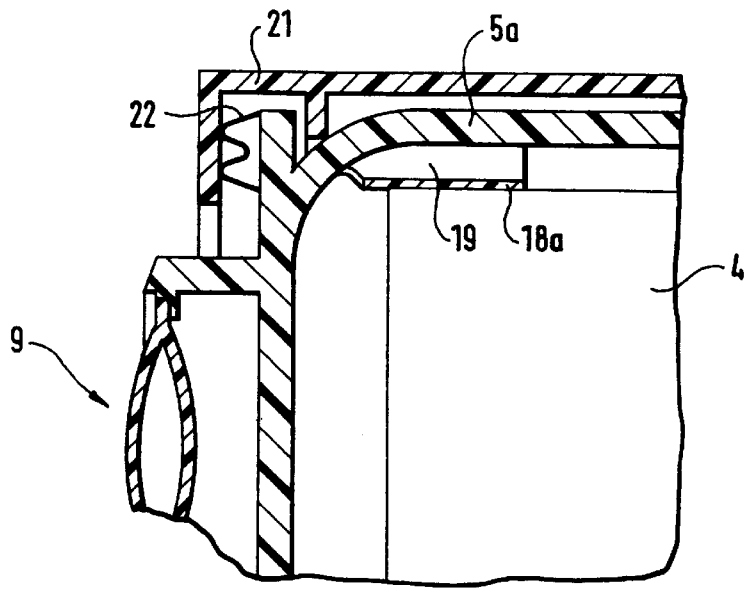
FIG. 3 is an enlarged partial view of area III in FIG. 1.
Figure 4:
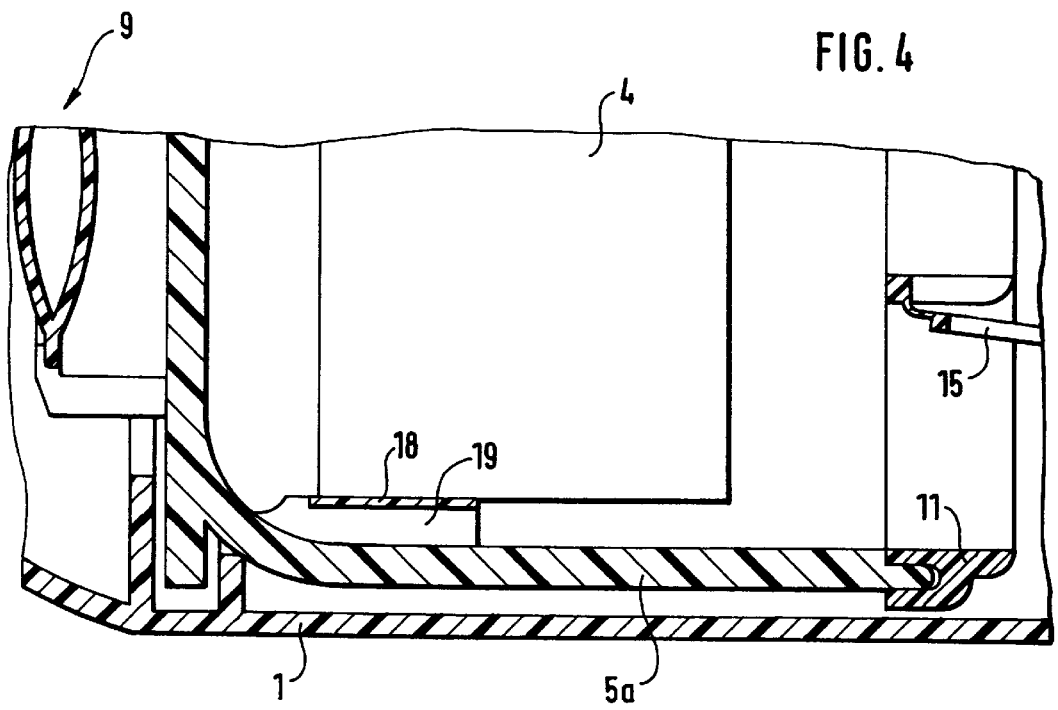
FIG. 4 is an enlarged partial view of area IV in FIG. 1.
Figure 5:
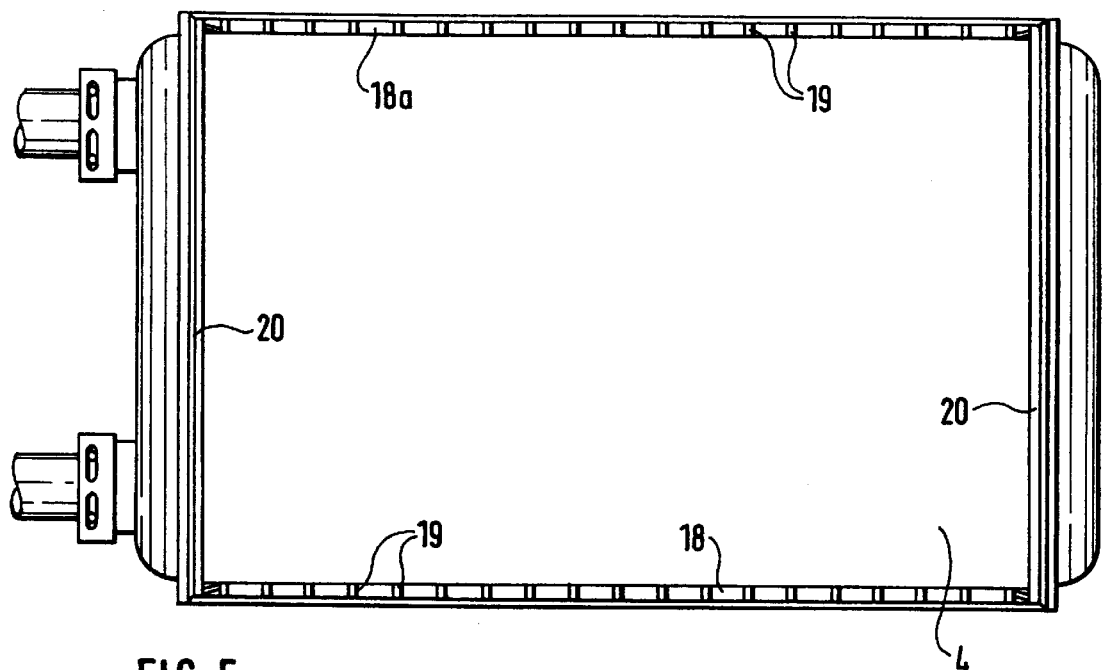
FIG. 5 is a section through the heater shown in FIG. 2.

FIGS. 3 and 4 show that the frame 11 is snapped endwise onto the open end of the plug-in part 5a of the housing 5 after the heater 4 has been inserted into the plug-in part 5a. Since the heater 4 is intended to be sealed off as completely as possible in housing 5, a strip-shaped sealing strip 18 or 18a is provided inside the plug-in part 5a on opposite sides. This strip is made of a relatively solid but low-friction plastic. These two sealing strips 18 and 18a have ribs 19 (FIGS. 3 to 5) made of an elastic plastic material injected beneath them. The strips, in turn, are permanently attached to the plug-in part 5a. In this manner, when the heater 4 is inserted into the plug-in part 5a, no major difficulties arise. Heater 4 is applied against sealing strips 18, 18a and then pushed into its final position where it abuts a lateral sealing lip 20 that extends perpendicularly to sealing strips 18 and 18a. Heater 4 is therefore secured with a seal all the way around in plug-in part 5a. As FIG. 3 shows, plug-in part 5a, in turn, is provided with a sealing lip 22 injected on it that provides a seal against a mount 21 into which the plug-in part is pushed inside housing 1.

Figure 9:
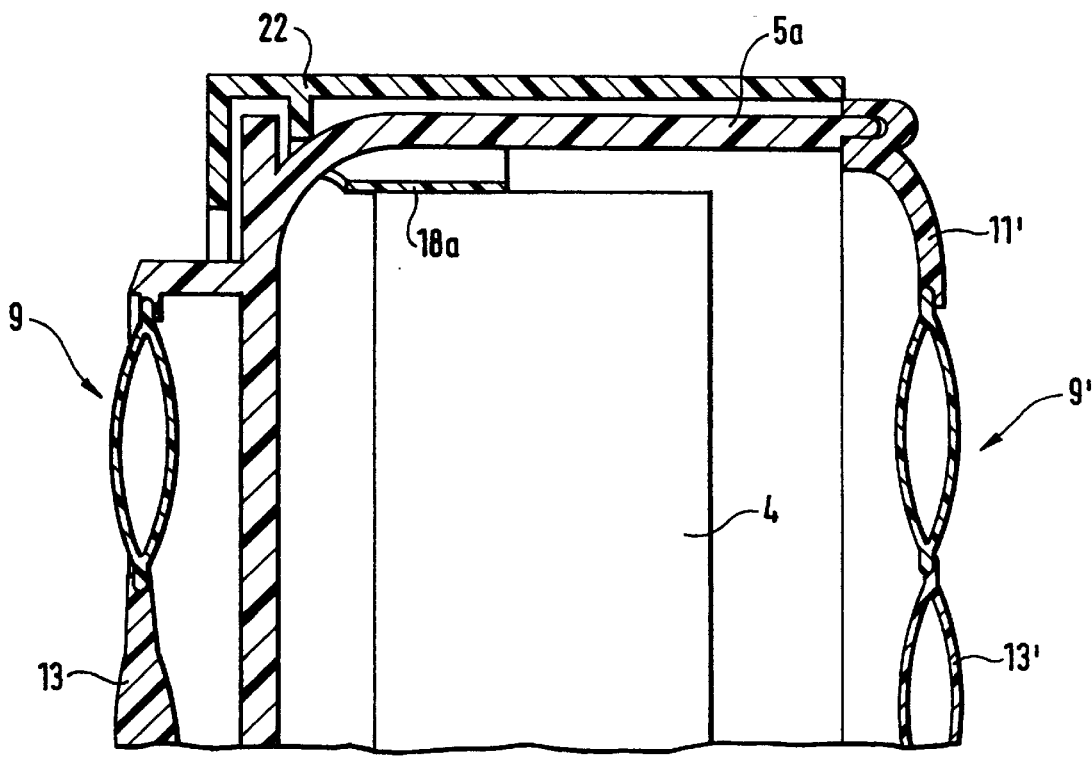
FIG. 9 is an enlarged view of a lengthwise section similar to FIG. 7, but with another embodiment of the housing for the heater.
Figure 10:
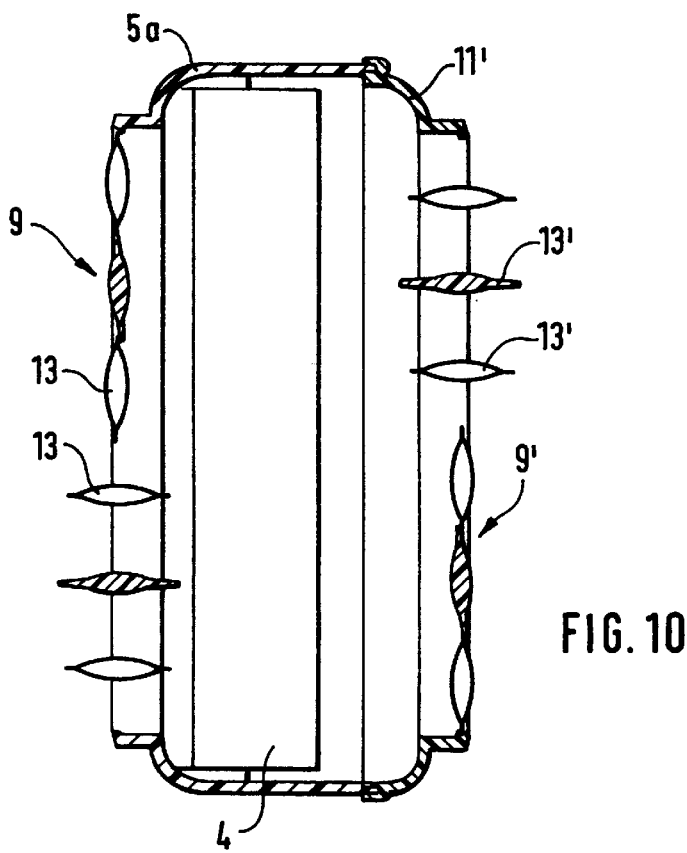
FIG. 10 is a view of the housing and the heater according to FIG. 9, set for partial flow through the heater.

FIGS. 9 and 10 show that the frame 11' can be provided with a shutter arrangement 9' mounted on plug-in part 5a instead of being provided with a check valve arrangement 12. In this manner, even with only partial opening of the shutter blades 13, a total through flow in the heater 4 that is as uniform as possible can be achieved by the shutter blades 13 and 13' when only some of the blades are to be opened, with each blade opened to a position that is not directly opposite another. As a result, better utilization of the heat transfer areas of the heater can be achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for heating and/or air conditioning a vehicle interior comprising:
   a heater located in an air guide housing,
   a frame-like housing, located transversely to an air stream, in which the heater is received, and
   control flaps for regulating the volume of air flowing through,
   wherein the housing is made in two parts including a plug-in part for said heater and a housing part that is mounted on a plug-in side of the plug-in part, and
   wherein the plug-in part and the housing part are provided with elements for opening and closing at least a part of a free through flow cross section.

2. Device according to claim 1, wherein the housing part is a frame that can be mounted elastically on the plug-in part.

3. Device according to claim 1, wherein at least the plug-in part includes a controllable shutter arrangement having said elements.

4. Device according to claim 3, wherein said shutter arrangement includes shutter flaps, at least some of which are individually controllable.

5. Device according to claim 2, wherein the elements for opening and closing include a check valve arrangement mounted on said frame.

6. Device for heating and/or air conditioning a vehicle interior comprising:
   a heater located in an air guide housing, a frame-like housing, located transversely to an air stream, in which the heater is received, and control flaps for regulating the volume of air flowing through, wherein the housing is made in two parts and has a plug-in part for said heater and a housing part that is mounted on a plug-in side of the plug-in part, wherein the plug-in part and the housing part are provided with elements for opening and closing at least a part of a free through flow cross section, wherein at least the plug-in part includes a controllable shutter arrangement having said elements, wherein said shutter arrangement includes shutter flaps, at least some of which are individually controllable, and wherein the elements for opening and closing include check valves mounted pivotably in front of outlet slots and a frame which forms a supporting surface aligned diagonally with respect to a horizontal plane for the check valves.

7. Device according to claim 1, wherein the plug-in part is provided with a circumferential seal relative to said heater.

8. Device according claim 7, wherein the seal, on at least two opposite sides, is a sealing strip made of relatively hard material and can be pressed elastically against the heater.

9. Device according to claim 8, wherein the sealing strip is supported by a plurality of ribs on said plug-in part, said ribs consisting of elastic material.

10. Device according to claim 9, wherein the ribs are parallel to one another and aligned in an air flow direction.

11. Device according to claim 7, wherein said seal includes sealing strips and a sealing lip which is located beside sealing strips.

12. Device according to claim 1, wherein the plug-in part is in the air guide housing, and further comprising a mount on which the plug-in part is mounted and a sealing lip provided between the mount and the plug-in part.

13. Device for conditioning air supplied to a vehicle comprising:

a heater located in an air guide housing, a first heater housing portion forming a plug-in part receiving the heater and defining a first through flow area, a second heater housing portion forming a frame placed onto an open end of the first heater housing portion and defining a second through flow area, and elements provided on the first and second heater housing portions which open and close at least parts of the first and second through flow areas.

14. Device according to claim 13, wherein the frame is elastically mounted on said open end.

15. Device according to claim 13, wherein the elements form at least one controllable shutter arrangement.

16. Device according to claim 15, wherein the at least one shutter arrangement includes controllable shutter flaps.

17. Device according to claim 13, wherein the elements define a check valve arrangement on said frame.

18. Device according to claim 13, wherein the elements define check valves pivotally mounted in outlet slots within said frame.

19. Device according to claim 13, and further comprising a circumferential seal provided to said plug-in part.

20. Device according to claim 13, wherein the circumferential seal includes a sealing strip supported by ribs on said plug-in part.

* * * * *